United States Patent Office 3,489,590
Patented Jan. 13, 1970

3,489,590
PROCESS FOR NICKELING PLASTICS MATERIALS
Walter Herwig, Frankfurt am Main, Germany, assignor to Farbwerke Hoechst Aktiengesellschaft, Frankfurt am Main, Germany, a corporation of Germany
No Drawing. Filed May 1, 1967, Ser. No. 634,887
Claims priority, application Germany, May 5, 1966, F 49,124
Int. Cl. B44d 1/092
U.S. Cl. 117—47                                                19 Claims

ABSTRACT OF THE DISCLOSURE

Process for nickeling the surfaces of plastics materials by dipping them into solutions of 1,5-biscyclooctadiene-nickel(O). Chlorine-containing, bromine-containing or chlorine- and bromine-containing materials are dipped without pretreatment. Halogen-free materials are dipped after pretreatment to brominate or chlorinate their surfaces. Fluorine-containing and fluorine- and chlorine-containing materials are dipped after pretreatment to etch and either chlorinate or brominate their surfaces.

---

The present invention relates to a process for nickeling the surfaces of plastics materials.

The object of the present invention is a process for nickeling plastics materials according to which—

(a) chlorine-containing, bromine-containing or chlorine- and bromine-containing plastics materials are dipped without pretreatment or
(b) halogen-free plastics materials after pretreatment to brominate or chlorinate the surface thereof, and
(c) fluorine-containing and fluorine- and chlorine-containing plastics materials after a pretreatment to etch and to chlorinate or brominate the surface thereof into a solution of 1,5-biscyclooctadiene-nickel(O) at a temperature of from 20 to 65° C. and atmospheric pressure. The 1,5-bis-cyclooctadiene-nickel(O) which, when moist with water, constitutes a compound stable in air in which formally nonvalent nickel is bound in sandwich structure with two 1,5-cyclooctadiene rings, decomposes on the surface of plastics materials with the formation of a firmly adhering layer of metallic nickel.

When, for example, a shaped structure of a plastics material, such as a sheet or film of polyvinyl chloride, is dipped into a dilute solution of 1,5-biscyclooctadiene-nickel(O), for example a 1% solution in benzene, the shaped structure is coated with a dense layer of metallic dull, very dark grey nickel layer which cannot be removed by mechanical means. The coating speed depends on the temperature of the 1,5-biscyclooctadiene-nickel(O) solution. At a temperature of 40° C., for example, the layer forms within 20 to 60 seconds. It is remarkable that the chlorine bound in the polyvinyl chloride obviously has an important effect in the catalytic decomposition of the 1,5-biscyclooctadiene-nickel(O) (BCO-nickel). When a plastics material that is free from chlorine, for example polyethylene, is treated in analogous manner, a very thin and mostly transparent nickel layer only forms in the course of many hours, which layer can be removed by simply rubbing with a cloth.

This difficulty can be overcome with numerous chlorine-free plastics materials by treating the articles to be nickeled with dilute neutral or alkaline chlorine or bromine water to halogenate the surface. The articles may also be treated with a current of moist chlorine or bromine gas. Another method for treating the surface consists in dipping the plastics article into or spraying it with a chlorohydrocarbon, such as chlorobenzene, carbon tetrachloride, chloroform or tetrachloroethylene. On plastics materials treated in this manner firmly adhering nickel coatings can rapidly be produced.

Because of their being completely inert towards elemental chlorine and bromie, fluorine- or fluorine- and chlorine-containing plastics materials must be subjected to an additional pretreatment. It is known that fluorine- or fluorine- and chlorine-containing plastics materials can be etched on the surface by means of alkali metal solutions, for example in liquid ammonia or in phosphoric acid trisdimethylamide. If this pretreatment is carried through, a subsequent short treatment with chlorine or bromine water enables the plastic material to be provided with a firmly adhering coating by the nickeling according to the invention.

Plastics materials that can be nickeled according to the invention are, for example, thermoplasts such as polyethylene, polypropylene, polyvinyl chloride, fluorine-containing plastics such as polytetrafluoroethylene, polyacetals such as polytrioxane and copolymers of trioxane with cyclic acetals or ethers, polycondensation products such as polyesters, for example polyethylene terephthalate. Thermosetting plastics such as phenylformaldehyde resins can likewise be nickeled according to the process of the invention.

More particularly, the nickeling according to the invention is carried out as follows: the plastics article is dipped into an organic medium containing BCO-nickel in dissolved form. Benzene is preferably used as solvent for the 1,5-biscyclo-octadiene-nickel(O). The concentration of the solutions varies between 0.5 to 3 and preferably 1 to 2% by weight. The nickeling is carried out at a temperature in the range of from 0 to 80° C., preferably 10 to 60° C. The residence time of the article to be nickeled in the solution depends on the desired thickness of the nickel coating. It is easy to produce nickel coatings having a thickness of about 1 to 10μ. The residence time of the plastics article in the solution also depends on the concentration of the BCO-nickel solution, on the temperature of the solution and, above all, on the type of the plastics material to be nickeled, or on the type and intensity of the pretreatment. In each case the optimum conditions can be easily and rapidly determined and adjusted. When sheets of polyethylene and sheets of polypropylene are dipped into chlorine water for equal periods of time, for example 5 minutes, and the sheets are subsequently nickeled, a thicker nickel coating is formed on the polypropylene than on the polyethylene within the same period of time. Alternatively, nickel coatings having the same thickness can be produced on polyethylene and polypropylene having undergone the same pretreatment by variation of the residence time in the BCO-nickel solution.

It is also possible to produce nickel coatings of equal thickness by choosing different chlorination times for the pretreatment of the surfaces of polypropylene and polyethylene. Similar considerations apply to the temperatures of the nickeling baths. With each immersion the nickeling bath used is depleted of the deposited amount of nickel. About 20 grams of BCO nickel are required, for example, to provide 1 square meter of plastics material with a nickel coating of 1μ. The concentration of BCO nickel to be found favorable for a definite plastics material can be maintained constant by continuously supplying new BCO nickel solution and continuously withdrawing the exhausted solution. The cyclooctadiene set free during the nickeling has no disturbing effect in the process according to the invention. It concentrates in repeatedly used baths, from which it may be recovered at any time by simple distillation. It may then be used again for the preparation of BCO nickel.

The process according to the invention can be modified in various ways. It is possible, for example, to nickel the entire surface of a plastics article. It is also possible, however, to nickel only certain areas of the surface and to produce in this manner patterns and designs on the surface. In the latter case, a polyethylene sheet is covered with a thin paraffin layer by dipping it for a short period of time into a hot liquid paraffin bath. The desired design is then scratched into the paraffin layer or a pattern is impressed with a heated cliché. This prepared sheet is then dipped for a short period of time into a bath with chlorine or bromine water. The paraffin layer is removed by scraping, melting or dissolution, whereupon the sheet is dipped into a BCO nickel bath. Metallic nickel deposits on the desired areas.

The process according to the invention offers the advantage of being very simple and easy to carry out. It enables numerous plastics materials to be nickeled either completely or in any desired pattern. The nickel coatings obtained firmly adhere to the surface and cannot be rubbed off. They can be polished with polishing brushes to a high lustre. Furthermore, they constitute excellent supports for other metal coatings and are suitable for the manufacture of printed circuits in telecommunication techniques. Still further, they are interesting in reproduction techniques. Since plastics powders and plastics granules can also be nickeled in simple manner, the process of the invention permits the manufacture of novel catalysts, for example for hydrogenation reactions.

The following examples serve to illustrate the invention.

EXAMPLE 1

In a nitrogen atmosphere 1 mm. thick pressed transparent sheets of polyvinyl chloride were dipped into a 1.5% benzenic solution of 1,5-biscyclooctadiene-nickel-(O).

(a) At 20° C. a transparent nickel coating formed on the sheet within 5 minutes, after 2 hours the sheet had become opaque and was covered with a uniform, abrasion resistant nickel layer.

(b) At 40° C. the sheet became opaque after 2 minutes and was covered with an abrasion resistant nickel coating having a blackish dull metallic lustre.

(c) At 65° C. the same effect as sub (b) was reached after 50 seconds.

EXAMPLE 2

Polyethylene and polypropylene sheets having a thickness of 1 mm. were subjected to a pretreatment as indicated in the following table and then coated with an abrasion resistant nickel layer in a 1.5% benzenic 1,5-biscyclooctadiene-nickel(O) solution.

TABLE

| Polymer | Pretreatment | Temp. of Ni solution, ° C. | Nickeling period until transparency disappeared |
| --- | --- | --- | --- |
| Polyethylene | 10 min. in dilute chlorine water. | 40 | 4 min. dull metallic lustre. |
| Polypropylene | do | 40 | 3 min. dull metallic lustre. |
| Polyethylene | 10 min. in 0.5% bromine water. | 40 | 2 min. black lustrous. |
| Polypropylene | do | 40 | 90 sec. black lustrous. |
| Do | 20 min. in carbon tetrachloride. | 40 | 8 min. grey metallic lustre. |
| Do | 20 min. in chloroform. | 40 | Do. |
| Do | 20 min. in tetrachlorethylene. | 40 | Do. |
| Do | 20 min. in chlorobenzene. | 40 | Do. |

EXAMPLE 3

A polyethylene sheet was dipped in molten paraffin and provided with a thin coating. With a metal spatula a pattern was scratched into the paraffin layer. The pretreated sheet was placed for 10 minutes into dilute chlorine water, washed and dried, whereupon the paraffin layer was removed. By dipping the sheet for 4 minutes into a 1.5% benzenic solution of 1,5-biscyclooctadiene-nickel(O) at 40° C., the areas on which the paraffin layer had been removed were covered with a firmly adhering nickel coating.

EXAMPLE 4

A 1 mm. thick sheet of polytetrafluoroethylene was treated for 6 minutes in a nitrogen atmosphere in a 0.5 N solution of sodium potassium (1 part of sodium, 3 parts of potassium) in phosphoric acid trisdimethylamide. The sheet was washed with methanol and placed for 10 minutes into chlorine water having a temperature of 50° C. The sheet was washed with water, dried and dipped for 2 minutes into a 1.5% benzenic solution of biscyclooctadiene-nickel of 50° C. The polymer was covered with a dense, firmly adhering nickel layer.

What is claimed is:

1. A process for nickeling plastic materials which comprises dipping a substrate selected from the group consisting of
    (a) chlorine-containing, bromine-containing and chlorine- and bromine-containing plastic material without pretreatment,
    (b) halogen-free plastic materials after pretreatment to brominate or chlorinate the surface thereof, and
    (c) fluorine-containing and fluorine- and chlorine-containing plastic materials after a pretreatment to etch and to chlorinate or brominate the surface thereof into an organic solution containing 0.5 to 3% by weight of 1,5-biscyclooctadiene-nickel(O) at a temperature in the range of from 20 to 65° C.

2. The process of claim 1, wherein the temperature is in the range of from 20 to 40° C. and the solution contains 0.5 to 2% by weight of 1,5-biscyclooctadiene-nickel(O).

3. The process of claim 1, wherein the surface of the plastics material is provided with a nickel coating having a thickness of 1 to 10$\mu$.

4. The process according to claim 1 wherein the pretreatment to chlorinate the surface is carried out with a neutral aqueous chlorine solution.

5. The process according to claim 1 wherein the pretreatment to brominate the surface is carried out with a neutral aqueous bromine solution.

6. The process according to claim 1 wherein the pretreatment to chlorinate the surface is carried out with an alkaline aqueous chlorine solution.

7. The process according to claim 1 wherein the pretreatment to brominate the surface is carried out with an alkaline aqueous bromine solution.

8. The process according to claim 1 wherein the pretreatment to chlorinate the surface is carried out in a current of moist chlorine gas.

9. The process according to claim 1 wherein the pretreatment to brominate the surface is carried out in a current of moist bromine gas.

10. The process according to claim 1 wherein the pretreatment to chlorinate the surface is carried out with an aliphatic liquid chlorohydrocarbon.

11. The process according to claim 1 wherein the pretreatment to chlorinate the surface is carried out with carbon tetrachloride.

12. The process according to claim 1 wherein the pretreatment to chlorinate the surface is carried out with tetrachloroethylene.

13. The process according to claim 1 wherein the pretreatment to chlorinate the surface is carried out with chloroform.

14. The process according to claim 1 wherein the pretreatment to chlorinate the surface is carried out with a liquid aromatic chlorohydrocarbon.

15. The process according to claim 1 wherein the pretreatment to chlorinate the surface is carried out with chlorobenzene.

16. The process according to claim 1 wherein the etching pretreatment is carried out by treating the surface with a solution of an alkali metal in liquid ammonia and the pretreatment to chlorinate or brominate the surface is carried out with a current of moist chlorine or bromine gas.

17. The process according to claim 1 wherein the etching pretreatment is carried out by treating the surface with a solution of an alkali metal in liquid ammonia and the pretreatment to chlorinate or brominate the surface is carried out with an aqueous chlorine or bromine solution.

18. The process according to claim 1 wherein the etching pretreatment is carried out by treating the surface with a solution of an alkali metal in phosphoric acid tris-dimethylamide and the pretreatment to chlorinate or brominate the surface is carried out with an aqueous chlorine or bromine solution.

19. The process according to claim 1 wherein the etching pretreatment is carried out by treating the surface with a solution of an alkali metal in phosphoric acid tris-dimethylamide and the pretreatment to chlorinate or brominate the surface is carried out with a current of moist chlorine or bromine gas.

References Cited

UNITED STATES PATENTS

| | | |
|---|---|---|
| 2,551,344 | 5/1951 | Scholl. |
| 2,789,063 | 4/1957 | Purvis et al. |
| 2,876,185 | 3/1959 | Wolinski. |
| 2,898,228 | 8/1959 | Kelley. |
| 3,167,491 | 1/1965 | Harrison et al. |

FOREIGN PATENTS 935,716 9/1963 Great Britain.

ALFRED L. LEAVITT, Primary Examiner

J. R. BATTEN, JR., Assistant Examiner

U.S. Cl. X.R.

106—1; 117—5.5, 100, 212